United States Patent
Bentley et al.

(10) Patent No.: US 6,437,784 B1
(45) Date of Patent: *Aug. 20, 2002

(54) IMAGE PRODUCING SYSTEM FOR THREE-DIMENSIONAL PIECES

(75) Inventors: Nita M. Bentley, Champlin; Heidi A. Emanuel, Maple Grove; Ayron B. Glynn, Eagan; Sheri M. Schellhaass, Plymouth; Achilles Dimitri Speliotopoulos, Woodbury, all of MN (US)

(73) Assignee: General Mills, Inc., Minneapolis, MN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/052,484

(22) Filed: Mar. 31, 1998

(51) Int. Cl.[7] ................................................ G06T 15/00
(52) U.S. Cl. ........................................................ 345/473
(58) Field of Search .................................. 345/348, 349, 345/473, 474, 475, 419, 418, 420, 421

(56) References Cited

U.S. PATENT DOCUMENTS 5,651,120 A * 7/1997 Kitagawa et al. ............ 345/347
5,867,161 A * 2/1999 Walsh ......................... 345/347
5,877,777 A * 3/1999 Colwell ....................... 345/473

OTHER PUBLICATIONS

Reynolds, "Flocks, Herds, and Schools: A Distributed Behavioral Model" Computer Graphics, vol. 21, No. 4, Jul. 1987.*

* cited by examiner

*Primary Examiner*—Phu K. Nguyen
(74) *Attorney, Agent, or Firm*—John A. O'Toole; Douglas J. Taylor; Bradley A. Forrest

(57) ABSTRACT

A set of tools provides the ability to generate computer-based representations of three-dimensional pieces and produce a representation of a combination of such pieces in a container such as a bowl. Tools such as the puff tool and flake tool change two-dimensional curves into three-dimensional pieces. Further tools are provided to bend, twist and shear three-dimensional pieces. A coating tool is used to create and modify a variety of coatings that are applied on top of cereal pieces to create frost, glaze and particulates. A container tool allows placement of pieces into a bowl. Pieces are randomized prior to dropping them into the bowl. Further tools continue to drop each piece and rotate them if necessary to avoid overlap. A computer rendered image is photorealistic but contains subtle differences that can be discerned upon close inspection.

13 Claims, 12 Drawing Sheets

510

| HDR FLAKE TOOL | |
|---|---|
| NAME | HDR_FLAKE |
| | HDR flake MakE |

TYPE OF FLAKE

512 — ◇ CORN
◇ WHEAT
◇ RICE
◇ WHEAT-OAT

CHANGE GEOMETRY PARAMETERS ☑ ~514
AMOUNT OF RIPPLE [1.00] ~516
THICKNESS [7.00] ~518
AMOUNT BEND [2.00] ~520
AMOUNT CUPPING [0.00] ~522

CHANGE SHADED PARAMETERS ☑ ~524
SHADER PARAMETERS

526 — ◇ CHANGE DEFAULT FLAKE SHADER
◇ MAKE NEW FLAKE SHADER
◇ USE ACTIVE FLAKE SHADER

BUBBLE SIZE [0.70] ~530
BUBBLE DENSITY [0.00] ~534
TRANSPARENCY [0.50] ~538

| RESET | SAVE | EXIT | GO |

FIG. 5

```
                                    ╭─740
┌───────────────────────────────────┐
│  TOTAL PIECES:          ┌───┐     │
│                         │200│──742│
│                         └───┘     │
│ ─────────────────────────────     │
│                         ┌───┐     │
│  CHEERIO                │100│ %─746│
│                         └───┘     │
│  CHOC_CHEERIO           │ 0 │ %─750│
│                         └───┘     │
│ ─────────────────────────────     │
│            PERCENT TOTAL:  100    │
│                                   │
│                                   │
│      ┌──┐  ┌──────┐               │
│      │OK│  │CANCEL│               │
│      └──┘  └──────┘               │
└───────────────────────────────────┘
```

FIG. 7B

```
                        ╭─750
┌───────────────────────────────────┐
│                                   │
│         RANDOM  OPTIONS           │
│         ───────────────           │
│     ◇ MAKE OPTIONS GLOBAL ~760    │
│     ◇ LOCK XYZ SAME ~762          │
│                                   │
│      SCALE X MAV DEV  ┌─┐ %─764   │
│                       │0│         │
│      SCALE Y MAX DEV  │0│ %─766   │
│      SCALE Z MAX DEV  │0│ %─768   │
│    RANDOM CVS MAX DEV │0│ %─770   │
│                                   │
│         ┌──┐  ┌──────┐            │
│         │OK│  │CANCEL│            │
│         └──┘  └──────┘            │
└───────────────────────────────────┘
```

FIG. 7C

IMAGE PRODUCING SYSTEM FOR THREE-DIMENSIONAL PIECES

FIELD OF THE INVENTION

The present invention relates to image production, and in particular to the production of images representative of combinations of three-dimensional pieces.

BACKGROUND

Design of products can be very expensive when prototypes for consumer testing are used to determine whether or not to actually develop products. In the dry cereal products industry, several production runs of a new type of cereal are made, and then photographed in a bowl or spoon. These photographs are referred to as bowl and spoon shots. The shots are then shown to consumers to determine whether or not cereal that looks like the cereal in the shots has appeal, and might be something that consumers would purchase. Similar shots are used to determine the appeal of ready to eat grain based snack foods.

A problem with this approach is that quite often equipment such as specific dies must be designed and built in order to produce the desired product. A pilot plant or small-scale cereal production system must also be run to produce the cereal for each shot. Many times several attempts must be made in order to get the desired color, shape and appearance. This is time consuming, and also expensive. Another problem is that the technology may not be developed yet and may not be worth the time and money just to see if consumers will like the product. Sub-optimal, less innovative products will be substituted instead.

One approach to obtaining pictures has been to draw them by hand, or by use of sophisticated electronic drafting tools or computer aided design tools. It is extremely difficult to obtain a drawing which is accurately representative of a spoon shot or a bowl shot. It is also time consuming. It is difficult to anticipate how multiple pieces will actually combine together. Thus, any such pictures are not likely to be a realistic representation of the combination of pieces in a container such as a spoon or bowl.

There is a need to obtain a high quality picture which realistically represents a combination of pieces in a container. There is a need to produce such a picture without actually producing physical pieces. There is a further need to obtain such pictures quickly and inexpensively for many different types of pieces and containers.

SUMMARY OF THE INVENTION

A set of computer tools provides the ability to computer generate representations of a three-dimensional piece and produce a representation of a combination of such pieces on a flat surface or in a container. In one embodiment, the pieces are pieces of cereal or grain based snack foods, and the container is a bowl or spoon. The representation is an image, such as a bowl shot or spoon shot showing multiple pieces that have been dropped into the container. The multiple pieces may be identical, or may be randomized. Further, multiple different types of pieces may be created, and each one randomized to create pieces for the container shot.

The tools enable a user to create a wide variety of cereal pieces in various settings in a short amount of time. They allow the user to create new pieces with an infinite variety of shapes, textures, colors, and coatings. Users can create replicas of existing pieces, which can then be modified. Users can also create new pieces from scratch, either in a three-dimensional or a two-dimensional format. The two-dimensional piece can then be operated on by tools such as a puff tool which essentially puffs the two-dimensional representation into a three-dimensional representation. Pieces can be created that exceed current manufacturing techniques to help determine from consumer feedback if modifications to the techniques to produce the pieces is worth the effort.

Once a piece is created, multiple shaper tools can be used to bend, twist and create shearing effects such as those created by a die knife to make the pieces even more realistic. A flake tool provides the ability to create cereal flakes from a simple two-dimensional representation. A coating tool is used to create and modify a variety of coatings that are applied on top of cereal pieces to create frost, glaze and particulates.

When getting ready to render a container shot, multiple pieces are created and provided to a bowl shot set of modules. The pieces are randomized in size and shape as desired. The bowl shot modules receive the pieces and simulate them being dropped into the desired container by modeling actual effects of gravity and interaction of the pieces with each other and the container. In one embodiment, the container is provided with a false bottom. The depth of the bottom is determined such that two images generated, one with and one without the false bottom provide substantially the same impression. A false bottom can save significant time in replicating and placing cereal pieces into the container as well as in rendering the container shot.

In a further embodiment, the container shot, or computer rendered image is as photorealistic as possible. In other words, it really looks like a bowl of pieces of cereal. These shots are actually used to test whether or not a cereal is appealing to consumers. An iterative process is used to modify the computer rendered image based on successive rounds or cycles of obtaining consumer feedback. Performing this process without actually producing cereal saves significant time, effort and expense. The resulting shot can even be used by engineers to modify cereal producing machinery and processes to produce a real cereal product that appears like the cereal in the shot.

While these shots are very photorealistic, it should be noted that very subtle differences can be discerned upon close inspection. Color and texture variation within a piece may not be as random as that of real cereal pieces, and there may be some detectable patterns within the computer rendered cereal pieces. There may also be some penetration between objects, however minimal. Further, lighting and shadowing variations may be detected where photographs of other objects that have been brought into the shot may have different lighting. If milk is not computer rendered in the shot, the cereal pieces will not cast natural reflections onto the milk. Further, some pieces may appear to be floating or in an unnatural position compared to real cereal pieces that have been settled due to gravitational forces. These characteristics are very minor, and do not affect the realistic nature of the rendered shots. To eliminate them would require significantly higher computer resources, which even if used, would not completely eliminate them. Thus, the rendered shots are sufficiently photorealistic to serve for consumer testing, and represent a tradeoff between absolute accuracy versus the use of more and more computer system resources.

DESCRIPTION OF THE FIGURES

FIG. 5 is a user interface panel for a flake tool for selection of parameters pertaining thereto.

FIG. 7B is a further user interface panel for a bowl tool for selection of parameters pertaining thereto.

FIG. 7C is a further user interface panel for a bowl tool for selection of parameters pertaining thereto.

DETAILED DESCRIPTION

In the following description, reference is made to the accompanying drawings which form a part hereof, and in which is shown by way of illustration, specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

The present invention is embodied in a set of tools that make use of a platform comprising a graphics software package running on a graphics based workstation. Many different types of graphics software package can be used, just as many different types of computer systems can also be used. A graphic workstation was selected in one embodiment because it is optimized to produce graphic images and works quite fast. The platform will first be described, followed by a general description of the tools, and how they interact to provide realistic images of combinations of three-dimensional pieces in a container. The tools are then described both in terms of user interaction to select parameters as well as how the tools then create and manipulate the images of the pieces. The images themselves will also be described with characteristics which differentiate them from real images as well as those created by other graphics tools.

Figure 1:
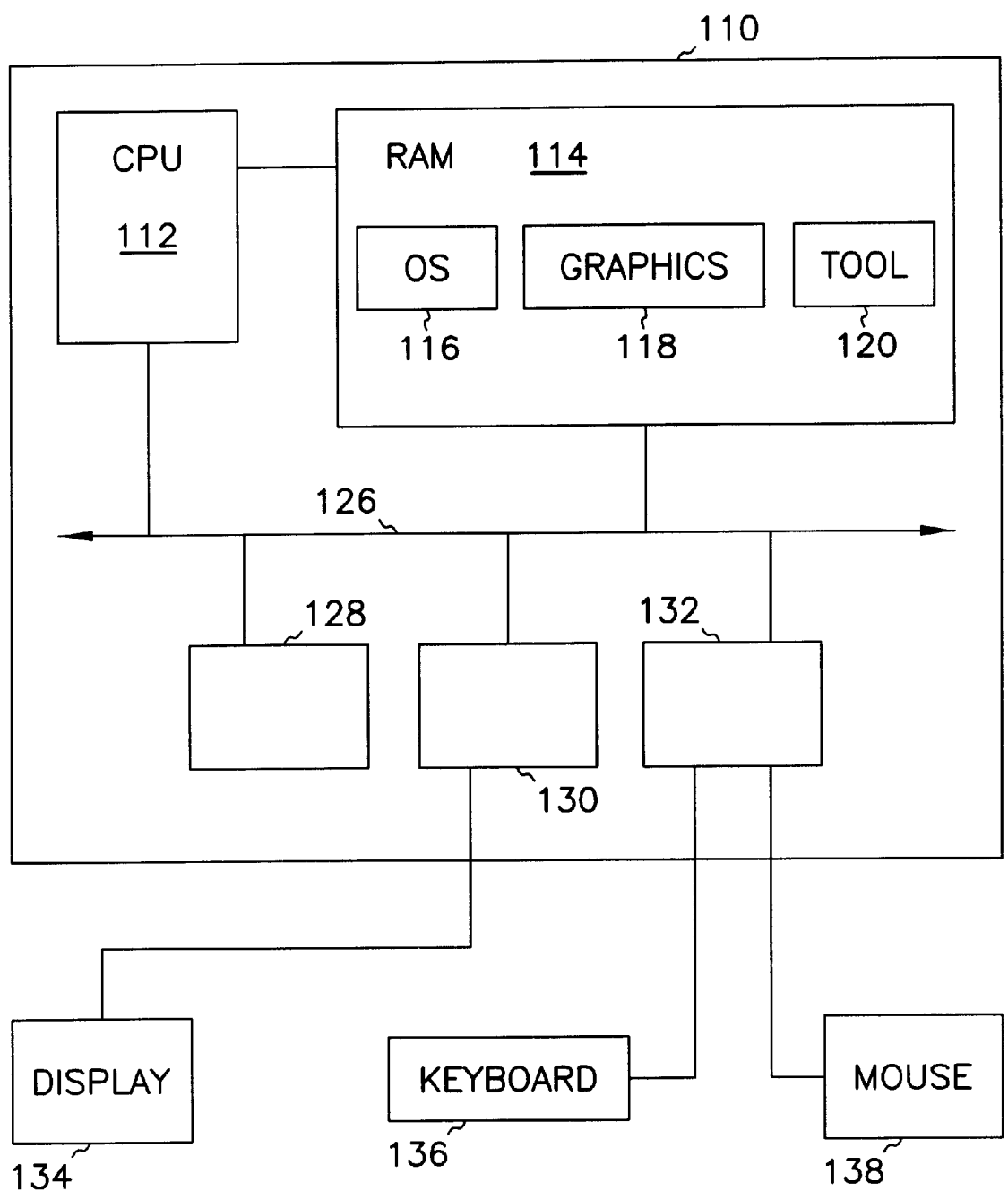
FIG. 1 is a block diagram of a computer system programmed to produce three-dimensional images.

In FIG. 1, a block diagram of a computer workstation is shown generally 110. Workstation 110 is shown very simplistically, but is rather quite complex as well known to those skilled in the art. In this embodiment, the workstation is one supplied by Silicon Graphics Inc. Some of the elements illustrated in FIG. 1 include a microprocessor 112 which may also include one or more co processors optimized for performing graphics calculations. Microprocessor 112 is coupled to a memory 114 such as random access memory (RAM). Memory 114 is representative of various levels of memory, including one or more levels of cache memory. Memory 114 is shown as containing and operating system 116 such as Unix, a graphics program 118 such as Alias|Wavefront, and a set of tools represented at 120 which interact with the graphics program 118. These programs can be thought of as modules or objects, and they contain programming code which causes the computer system, via processor 112, to perform various commands.

In this particular implementation, the computer language used in the development of the tools was C/C++. The base modeling software used was Alias|Wavefront. The tools were interfaced with Alias|Wavefront through the API (application programming interface). Additional graphical interfaces were developed in OpenGL and GL graphics languages.

A bus 126 is coupled to both memory 114 and microprocessor 112, and is also coupled to multiple control devices 128, 130 and 132. Control device 128 is used to represent machine readable media, such as secondary storage devices including disk drives, floppy drives, DVD, CD ROM and various other types of devices which store large amounts of data and programming, including storage of programs 116, 118 and 120, which are transferred from secondary storage to memory 114 as needed in a known manner. Control device 130 is a display device controller such as a VGA card which provides signals to a display device 134. Control device 132 is coupled to a keyboard 136 and pointing device 138 such as a mouse, touchpad, trackball, or other type cursor control device as are well known in the art. Bus 126 is used to represent multiple levels of various busses as well known in the art. Further control devices are coupled at different such busses and are used to provide networking, telecommunication and other functions.

Cereal product development (CPD) software provides a complete interface that allows the users to select starting cereal piece shapes, textures, colors, etc. from a library from which the user can then perform additional operations. This library/interface contains a variety of single cereal pieces, curves, and shaders (texture/color). The user can select curves which can then be loaded and converted to full 3D objects using other developed tools.: The user can also opt to select a 3D object and then apply any texture/color to it. This tool then takes care of the process of loading all of these selections into Alias|Wavefront graphics software.

The CPD software creates a graphics interface which displays all the selections available in the library and allows the user to make a selection in one of 3 areas. The first interface shows a variety of tabletop textures available. The tabletop texture is applied to a table that single cereal pieces will sit on. Each texture is displayed in a frame box that contains an image of the actual tabletop texture. The user can select or deselect a given texture from the choices available. Next, the user is given the ability to pick a curve or a 3D object (3D model of a cereal piece or snack food piece). The user can also select a single cereal piece which has both the shape and the texture. Next, the user can choose additional textures and colors. Internally, the software looks at particular directories on the hard drive and looks for all files that contain a particular extension name (.hi extension). All files that contain this extension are included as possible selections in the cpd interface. This enables the user to add or delete cereal pieces from the library easily. Once all selections are made, the code will start the Alias|Wavefront software automatically, at which time the selections made in the library (cpd software) can be loaded.

Figure 2:
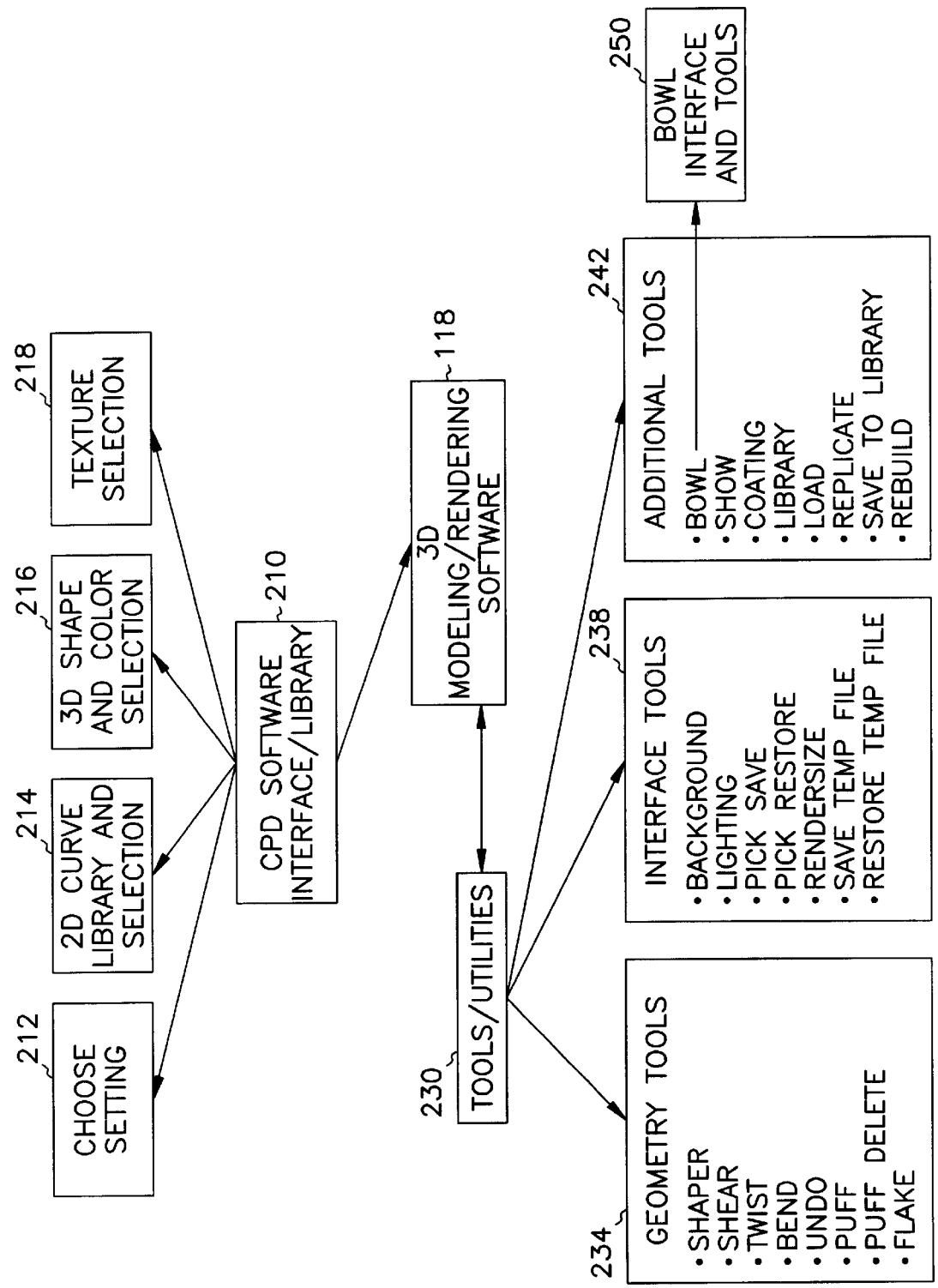
FIG. 2 is a block diagram of sets of tools used to create the three-dimensional images referenced in FIG. 1.

In FIG. 2, a block representation of the above software interaction is shown with the graphic software indicated at 118. Graphics software 118 is a very powerful graphic creation and manipulation tool. It has been used to create special effects for movies, but did not provide all the necessary tools optimized for the creation of individual pieces of food items such as cereal. Other, specialized tools comprising modules and objects which interact with software 118 provide optimized function for creating cereal pieces, and in addition for placing such pieces realistically in a container. The tools include a graphical user interface 210 to multiple libraries and setting selections indicated at 212, 214, 216 and 218. Libraries 214 and 216 contain shapes or curves which are both two-dimensional and three-dimensional and comprise such common shapes as hearts, stars, peanuts, ovals, diamonds, ellipses, squares, and others. The libraries also includes several different types of backgrounds or settings 212 corresponding to perspective representations of tabletops having different tablecloths, and textures 218. These can also be selected by a user. The graphical user interface 210 presents the choices as icons containing graphical representations for the item being selected. Shadings are also available for selection by the user. Many shaders are provided by the underlying graphics package, but others, such as coating shaders have been specifically designed for use on cereal pieces.

Other tools 230 interact directly with modeling software 118 to produce desired three-dimensional representations of pieces, such as cereal pieces. A set of geometry tools 234 include tools comprising shaper, shear, twist, bend, undo, puff, puff delete and flake. Interface tools 238 provide background, lighting, pick save, pick restore, rendersize, save temp file and restore temp file. An additional tool set 242 is comprised of a bowl tool with an associated interface and further tools 250. Tool set 242 further contains show, coating, library, load, replicate, save to library and rebuild tools. The geometry tools set 234 is used to manipulate selected shapes. The graphic software 118 can also be used to create new shapes. As is well known in the art, starting control vertices or points can be selected and connected to form a wire frame in a desired shape. Once a shape is selected, if it is a two-dimensional shape, it can be transformed into a three-dimensional shape by either the puff tool or by the flake tool, both of which will be described in further detail below. The puff tool takes a two-dimensional shape and turns it into a puffed three-dimensional shape. The flake tool takes a two-dimensional shape and turns it into a three-dimensional flake, which is much different than a puffed shape. Because there is a significant difference in end shape if both tools started with the same two-dimensional shape, input parameters to the tools are quite different. While they can be combined into a single tool, it was more convenient to deal with them separately. The coating tool is used to provide various types of cereal coating which can be layered on top of pieces.

The bowl tool, also referred to as a container tool, is shown interacting with the graphic software at 118. It provides a user interface for selecting the types and number of pieces and through many operations, creates a bowl of cereal. It allows the user to select parameters to randomize pieces that are being created so that no two look alike. The container tool interfaces with the graphics software and the other tools to create each of the individual pieces based on the parameters selected by the user. The container tool then takes the pieces and individually places them into the container.

Geometry tools that are unique to piece manipulation and design are also indicated 234. Tools such as a twist tool, a bend tool and a shear tool all manipulate a piece. The shear tool is designed to provide realistic deformations to a piece such as would be caused by a die knife cutting a piece. A shaper tool is used to modify the overall shape of a 3D cereal piece by deforming the piece which in turn creates a more natural look to the piece.

Interface tools 238 are used to modify the setting for an image to be rendered. The background tool can be used to select a background and modify the color of it and to specify whether or not to render shadows. The lighting tool is used to change the amount of light in the rendered scene. The tool is used to change the intensity of the lighting as well as the darkness of the shadows. Angles of the light can also be modified. Pick save keeps track of the objects which are currently selected and saves the list. Pick restore will restore those selected items and is useful when switching between items being worked on. Rendersize is used to set a size and window for rendering a scene. A panel is provided that allows selection of objects to render, format, output quality, resolution, and physical size of the images in the scene. Save temp file provides the ability to do a quick save prior to a major edit of the image, and along with restore temp file, allows undo of the edit.

The additional tool set 242 contains tools used to modify and manage pieces used in the container shot in addition to the container tool. The show tool is used to actually show the rendered image on a display. The coating tool provides realistic coatings on the pieces in the container. The library tool is used to start the CPD software 210 and allows users to grab objects and shaders from the library as they are working in the modeling software 118. The load tool loads selections from the CPD software into the modeling software environment, which provides the engine for actual image editing and manipulation. The replicate tool replicates objects and links them to coupled shaders. Objects are put in specifiable rows and columns next to the original object. Spacing between objects may be specified, as may randomization parameters including maximum randomization of control vertices and maximum xyz scale deviation. The save to library tool allows shapes to be saved and icons for them created for easier retrieval. Finally, the rebuild tool is used to reduce the complexity of a 3D surface (object) by eliminating some of the vertices that make up the shape. Rendering a large number of objects in a container with each object having a large number of vertices can add time to rendering the scene. It can also slow down the interface to the modeling software. Basically control vertices may be selected, and a percent specified to either reduce or increase the surface or curve variations.

Figure 3:
FIG. 3 is a user interface panel for a puff tool for selection of parameters pertaining thereto

The puff tool provides a user interface, referred to as a panel at 310 in FIG. 3A. The user selects multiple parameters from the interface, such as a roundness 312, height bottom curves 314, percent height 316, delete puff curve 318, advanced 320, number of curves 322 and insert percent height 324. The puff tool is designed for taking a curve that lies in the xy plane, such as a heart shaped curve shown at 330 in FIG. 3B, and replicating and resizing it to create a 3D object. One replicated and resized curve is shown in a 3D object indicated at 332 in FIG. 3C. Finally, a 3D perspective of a wire frame representation of the 3D heart shaped object is indicated at 334.

The roundness parameter 312 allows control of the degree of curvature of the puffed object. A marshmallow bit for example is flat on top and the degree of curvature between the top and a side is fairly high. Therefore, this parameter for a marshmallow bit should be set between 5.0 and 7.0. With respect to the height bottom curves parameter 314, puffing is started from the original 2D curve in both positive and negative directions along the z axis. If the user does not want the 3D shape to be symmetrical in both directions, the user can change the value of this parameter. The closer to 100 percent, the more symmetrical the puff will be. The percent height parameter 316 controls the height of the object. It is expressed as a percent relative to the width of the initial 2D curve. A typical value for a marshmallow bit may be about 60 and for a flat object, such as a flake, it may be around 15.

In order to make a 3D object, a series of 2D curves are created and then connected together. The delete puff curve parameter 318 determines whether these creation curves will be deleted when finished. In cases when the user desires to use some or all of the puff curves to create another shape, such as an object with holes, then this parameter should be turned off. Further advanced features may be provided by selection of the advanced features parameter 320. One advanced feature is the number of curves parameter 322 and the insert percent height 324. This feature will insert additional 2D curves if the gap distance between curves is greater than this percent of the total height of the object. A lower value will insert more 2D curves into the object.

In operation of the tool, the original 2D curve that the user creates is moved to the origin. It is then replicated, scaled and translated in the z direction. These curves continue to be replicated and stacked. The curves are stacked and scaled. The last curve replicated is scaled to a very small value in order to keep the 3D geometry that will be created, closed. When all of the curves are created, the parameterization of the surface formed by the curves is calculated, and the 3D surface is created.

In order to calculate the correct placement of the curve in the z direction (the curve lies in the xy plane), the following formula gives the change in height (in z) of the current curve and the previous curve.

$$Dh = height\_max * [N^{(1/p)} - (N-1)^{(1/p)}] * [delta\_x/RO]^{(1/p)}$$

where:

height_max is the maximum height of the individual curve. This is determined by an inputted value from the user, N is the number of curves that are used in the puff, P defines the shape of the puff and is inputted by the user, RO is defined as the distance from the center of the original curve to the furthest cv (control vertex) on the curve, and delta_x is an input value Dh determines the z height at which the $N^{th}$ curve should be drawn.

Several other tools will now be described, including the flake tool 214, which relies on other tools, which will be described first. These are referred to as geometry tools because they modify the geometry or shape of a 3D object. The first such tool is a shaper tool which is used to modify the overall shape of a 3D object by deforming the piece which in turn creates a more natural look to the piece. It creates pieces that have bumps and dips for instance.

Figure 4:
FIG. 4 is a user interface panel for a shaper tool for selection of parameters pertaining thereto.

A graphical user interface panel is provided at 410 in FIG. 4 to make selection of parameters easy. As with all such interfaces, individual commands with parameters can also be entered, and in some instances results in faster operation of the tool. User interface 410 provides a show function samples checkbox 412, which if checked, is the only button that will be shown. When the tool is run with this checked, a panel will be displayed showing some sample functions applied to a generic shape and the parameters used. This provides the user some feeling for how the parameters will affect a 3D shape in which it is applied. Under a function menu, a single function can be selected such as "Depress z" at 414. This will depress control vertices in the z direction relative to the center of the object. It is used to create bowl shape depressions from a flat object. Other functions in the group operate in a similar fashion. They apply the given function on the vertices by moving them in the z direction. The amount of movement in the z direction depends on the form of the function used. For example, the function z =sin(x) at 416 indicates that the z value of the control vertex will only depend on the x of the control vertex relative to the center of the piece. The sine function will then be applied to the x value.

At 418, an amplitude parameter determines how much the z value changes. It is a weighting factor wherein the lower the number, the closer to the original shape the object will resemble once run. Of course, the converse is also true. The higher the amplitude the more the object will be distorted from the original. Frequency parameters 420 and 422 determine the number or ripples or waves that will be created in the respective directions for all functions except the depress function. The higher the number, the more ripples. Frequency in y also does not affect the functions which only depend on x.

In operation, a user interacts with the tool via the panel 410 to select a given function from a list which is used to shape the cereal piece. The user can choose from several different functions such as a cosine or sin function as well as a depress function. The control vertices of the piece are modified according to the function chosen. A variety of shapes and patterns can be created such as ripples, bumps, and dips. A sample image can be displayed which shows examples of several functions and various parameters applied to a generic shape.

Several function can be chosen, which internally have the form:

$$new\ cvz = cvz + (T1*T2*T3*T4)/amplitude$$

kx=frequency in the x as inputted by the user
ky=frequency in the y as inputted by the user
amplitude is inputted by the user $$T1 = \cos(alphax + (cvx - ax))$$

$$T2 = \cos(alphay + (cvy - ay))$$

$$T3 = \cos(kx*(cvx - bx))$$

$$T4 = \cos(ky*(cvy - by))$$

alphax and alphay are set to 4.0 but can be changed
ax,ay,bx,by is set to 5.0 but can be changed
Another function is:

$$new\ cvz = cvz + (\sin(kx*cvx - ax) + \sin(ky*cvy - ay))/amplitude$$

A shear tool is used to distort the original geometry by shearing the piece in the x or y direction. This can be used to add more realistic shape for marshmallow bits and similar pieces as it was designed to mimic the shear of an actual cereal piece that takes place during knife cutting after extrusion.

Each cv of the given piece is examined and normalized. The piece is then shifted in the x or y depending on the z value of the cv.

Angle=80.0−(amount_shear−1)*6.0 (normalize the shear)

radians=(Angle*pi)/180.0 tan_theta=tan(radians)

for each cv on the surface calculate xnew=cvx+(cvz−minz)/tan_theta (shear in x)

ynew=cvy+(cvz−minz)/tan_theta (shear in y)

where
   minz is the lowest cv z value for the surface
   and pi=3.14159
   amount shear is inputted by the user A twist tool twists a given 3D cereal piece to create more realistic geometry. A user interface is also provided for this function with the only parameter being the amount of twist to apply to the object. The amount of twist is performed about a reference line drawing. The units for the amount of twist are in degrees. A value higher than 360 degrees or 2 pi radians may be entered. This can be used to create multiple revolutions, such as for a pretzel.

When using the twist tool, a user draws two criss-crossing lines which define the axis about which the twist will take place. A line which bisects these two lines is calculated. The surface (cereal piece) is rotated such that the bisecting line lies along the y axis. For each cv (control vertex) rotate the cv about the y axis proportional to the distance of the cv in the y to the center of the 2 criss-crossing lines.

A bend tool bends the given 3D cereal piece to create more realistic geometry for cereal pieces. Two fields are filled in in a graphical user interface to control the bend tool. The first field is a shape of bend parameter that is a number which is actually the power used for the bend function. The shape of the bend can be controlled by selection of this parameter. The user can start with one value, and then undo the changes to experiment to obtain a desired shape. The second parameter is modified in a field called the "amount of bend" field. The value entered determines how much the shape will actually bend. Lower values mean less bend. The actual values used in the tool are at the discretion of the developer. To invoke the tool, the user defines a line on the piece which gives the location on the cereal piece from which to bend. The shortest distance from the given cv of the object to this line is calculated and then the cv is moved in the z direction a proportional distance from the bend line.

cvz_new=cvz+r$^P$/amplitude where
   r is $(cvx*cvx+cvy*cvy)^{0.5}$ and amplitude and P are inputted by the user
   cvx,cvy,cvz are the x,y, and z coordinates for the given cv
   x and y of each cv are also changed in order to preserve volume of the cereal piece which in turn adds to the realism.

An undo tool is used to undo the changes made by the shear, twist, bend, or shaper tools. When the shear, twist, bend, or shaper tools are run all of the cv coordinates are saved to a separate file. When the undo tool is run the object has each cv restored to the saved value.

A puff delete tool deletes the puffed surface that was created using the puff tool. When the puff tool is run the name of the surface created is saved. This tool then gets the name of the puff surface created and gets a pointer to this object and then deletes it.

The flake tool allows the user to create a variety of flakes from a simple 2D curve. This gives the user the ability to create a variety of flake shapes and textures easily. The flake tool takes the inputted 2D curve and then calls other tools such as puff, bend, and twist, with parameters that are appropriate to the type of flake being created and the specific flake parameters. It creates all needed bend and twist lines. It also creates the texture and color which is appropriate for the type of flake desired. It can modify a flake that has already been created as well. The user interface for selecting parameters for the flake tool is shown at 510 in FIG. 5. At 512, several check boxes for the type of flake to create are indicated, including corn, wheat rice and a wheat-oat combination. Each flake has different characteristics that these selections affect. The parameter is used to set other parameters, such as thickness, ripple and others to default values based upon the type of flake desired. The parameter can be altered by changing the remaining values to obtain desired properties. A user may desire a flake that contains most of the properties of a corn flake, but is thicker, more like a rice flake. By selecting the corn flake as the starting point, one need only modify a thickness parameter to a larger value.

A change geometry parameter checkbox 512 allows the other values to be changed. This would normally not be checked if the user had already created a flake. An amount of ripple field 514 determines the amount of waviness that the flake created will have. Too much rippling will cause unnatural texturing and distortion. Thickness parameter 518 determines the thickness of the flake and is expressed as a percent height as in the puff tool. An amount of bend parameter 520 is similar to the amount of ripple parameter, but is used on a larger scale. A flake, for example, might have one or two large bends, but several smaller waves. This parameter is actually passed to the bend tool, which automatically bends the flake. Certain flakes exhibit a kind of depression towards the center of the piece which is known as cupping. A cupping parameter indicated at 522 which is used to indicate the amount of cupping affects the other parameters such as bending.

A change shader checkbox 524 allows changing of the shading of the object. The off option is used when a shader is already created with the desired texture. Three shader options are indicated at 526. When a flake of a given type is created, the tool will check to see if the default texture for that type of flake has been loaded. If it has not, it will load that shader, and then modify the shader based on values that the user has inputted in the tool, such as transparency. If shader parameters have been checked, then several possibilities exist for the shader that will be modified. First, the default shader of the given flake type can be changed. Secondly, a new shader can be requested to be created. Third, it can be requested that the shader that is assigned to the object at the time the tool is run be modified.

A bubble size parameter 530 controls the size of the bubbles or bumps created on the flake. A bubble density parameter 534 controls the density of the bubbles created on the flake. Finally, a transparency parameter indicated at field 538 controls the transparency of the flake. A value of 0.0 means that the shader exhibits no transparency. Certain types of flakes such as a rice flake will exhibit more transparency in the flake due to the thickness, composition, or the number of defects in the flake.

The container or bowl tool is used to take single cereal pieces that have been created and through many operations, create a bowl of cereal. The user is provided the ability to include up to twenty different types of pieces in the bowl and have control over such things as the percent of each piece to place in the bowl, total number of pieces to place in the bowl, and then different options for actually rendering the bowl. Piece size is very critical for getting a realistic looking bowl shot of cereal. If the pieces are too large, they will not fit into the bowl, and even if they do, they will look strange in relation to the bowl. A typical guide is to be able to fit ten to fourteen cereal pieces in a row across the diameter of the bowl. In one embodiment, the container is provided with a false bottom. The depth of the bottom is determined such that two images generated, one with and one without the false bottom provide substantially the same impression. A false bottom can save significant time in rendering a container shot. The depth of the bottom may be determined by an iterative process such that resulting shots do not vary significantly as the bottom depth is varied slightly.

Figure 6:
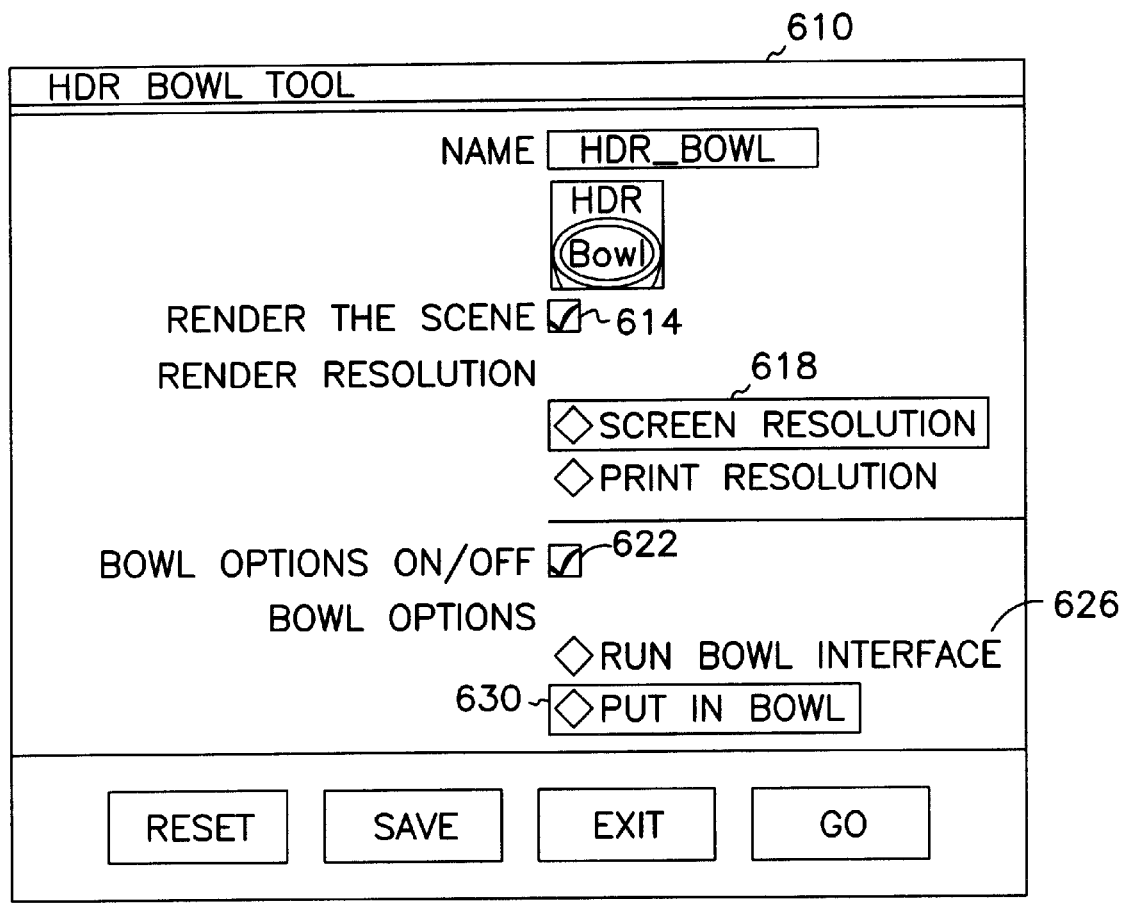
FIG. 6 is a user interface panel for a container tool for selection of parameters pertaining thereto.

A bowl interface screen is shown at 610 in FIG. 6. A first checkbox 614 is provided for the user to indicate that the scene is to be rendered. If this option is selected, as well as the bowl option "put in bowl" at 630, the image will be rendered immediately after the cereal has been put in the bowl. Before rendering, the user will need to select "run bowl interface" 626 in order to select the amount of pieces to be placed in the bowl, and then run "put in bowl" 630 to actually place the cereal in the bowl. At 618, screen resolution may be selected, or print resolution selected. Screen resolution will produce an image faster than print resolution, so in most cases, this would be the first choice even if it is known that an image will be printed.

At 622, a check box for bowl options is provided. If checked, a run bowl interface option 626 and the put in box option 630 are available. The run bowl interface option 626 is used to select the number and percentage of pieces to be placed in the bowl. The put in bowl option 630 is used if you have already run the interface and selected the pieces to go into the bowl. If this option is selected, the pieces will be replicated and placed in the bowl.

Figure 7A:
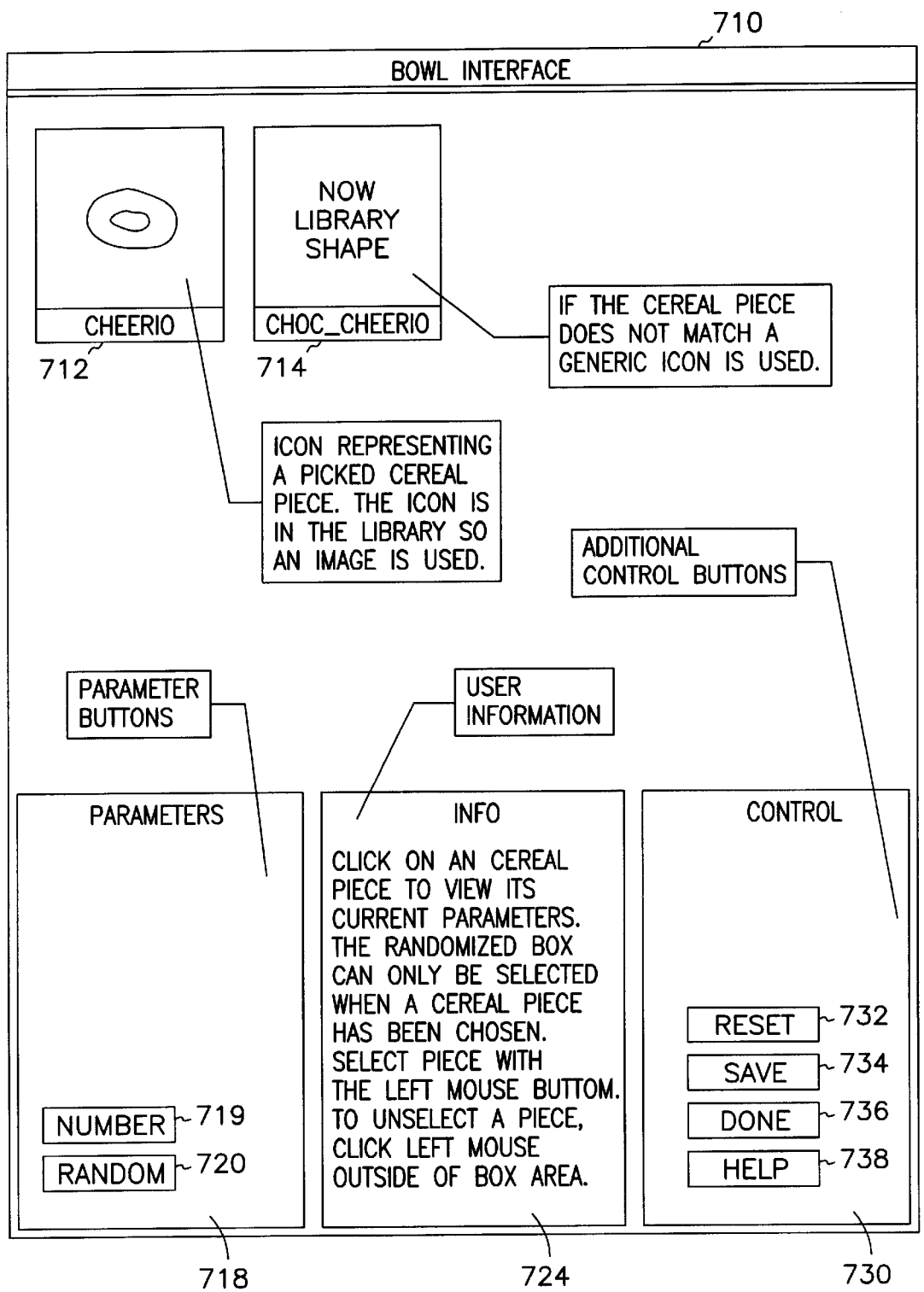
FIG. 7A is a further user interface panel for a bowl tool for selection of parameters pertaining thereto.

If the run the bowl interface option 626 is selected, a second bowl interface screen is provided as indicated at 710 in FIG. 7A: An icon 712 represents the picked cereal piece. Since the icon in this case is in the library, an image is used as the icon. If the cereal piece does not match one in the library, a generic icon is used at 714. All of the cereal pieces that have been picked for the bowl shot are represented by icons in the top half of the window. Two parameter buttons are shown at 718, one labeled "Number" at 719 and the other labeled "Random" at 720. The random button 720 is not selectable until a cereal piece is selected by clicking on one of the cereal icons. The reason for this is that the parameters apply to each cereal piece, so the user needs to let the interface know which cereal piece.

A number interface screen or panel is shown at 740 in FIG. 7B and is invoked by selection of number button 719. At the top of this panel, the total number of pieces is shown at 742. This is the total number of cereal pieces that will be put in the bowl. Generally, 200 should be considered an upper limit, but the actual number will depend on the size of the cereal pieces used. Below that, each cereal piece is listed along with the percentage to the right of it as indicated at 746 and 750 where one hundred percent cheerio pieces are selected and zero percent chocolate cheerios are selected. The total should add up to one hundred percent. OK and Cancel buttons are also provided.

When "Random" button 720 is selected, a random options panel 750 in FIG. 7C is provided to the user. When looking at a real bowl of cereal, there are no two pieces that appear exactly the same. The computer has the ability, unlike the real world to create pieces that are identical. This usually results in a slight non-realism. To avoid this, the user is given the ability to randomize the copies that are created. Each cereal piece as represented by an icon in FIG. 7A can be given its own randomizing parameters. If a first option, make options global 760 is selected, then any and all changes in this panel for the particular cereal piece will be made for all the cereal pieces. In other words if the user wants to add randomness to all cereal pieces, the user can make the change in one and apply it to all by selecting 760. A checkbox labeled lock xyz same at 762 is used when it is desired to scale the replicated cereal pieces the same as the original. In other words, when you want to just vary the sizes of the copies relative to the original, but keep the same exact shape, this option can be selected. The next three choices, 764, 766 and 768 are used to determine the scale factor in x, y and z respectively for the copies of the original cereal piece. This is expressed as a percentage from zero to one hundred. In general, a user starts with small values, such as one to five percent. This percentage represents the maximum scale factor in that direction that will be applied. The last parameter, random cvs max dev 770 is used to randomize the control vertices that are on the surface of the copies. A very small amount, if any should be used here, such as one to three percent.

In FIG. 7A, an information area 724 is provided to inform the user about selections or choices made. For example, it may display information about the total number of pieces selected, or the amount of randomization a particular piece has. The user can not enter any data into this area, as it is only there to provide the user with additional information. Additional buttons are provided in area 730. A reset button 732 is used to reset all values back to their default values. It will reset the number values as well as the random values. A save button 734 is used to save the choices in a default file. A done button 736 is used to quit out of the interface. If you did not hit the save button, then none of the selection choices you have made will be saved. A help button 738 will pop up a panel on the right hand side of the present panel and provide the user additional information about this interface.

Once the individual cereal pieces have been created, the user runs the above interface specific for the bowl. As described above with respect to one embodiment of this interface, it allows the user to determine the number and percent of each of the types of cereal pieces that will go into making a bowl shot. The user can also choose parameters that will randomize the pieces that are being created so as to create pieces in which no two are alike. This creates a more natural image. Which pieces, and the degree to which the pieces will be randomized can be chosen by the user. The randomization process allows a variety of options in order to create pieces that are similar to the original cereal piece, but have some small variations. The user can choose the maximum amount of scale in the x, y, and z directions. These parameters can also be locked to create the same scaling factor along each axis. For finer control, the cvs which make up the surface can also be randomized to a maximum level set by the user. Once these parameters are determined, the next step is for the code to replicate the pieces and randomize the geometry based on the parameters already chosen. The code will replicate the shader (texture/color) and fix the orientation of the texture/color relative to the original. The pieces are duplicated and the correct texture/color is assigned. The next step is to take each of these pieces and place them in the bowl.

Figure 8:
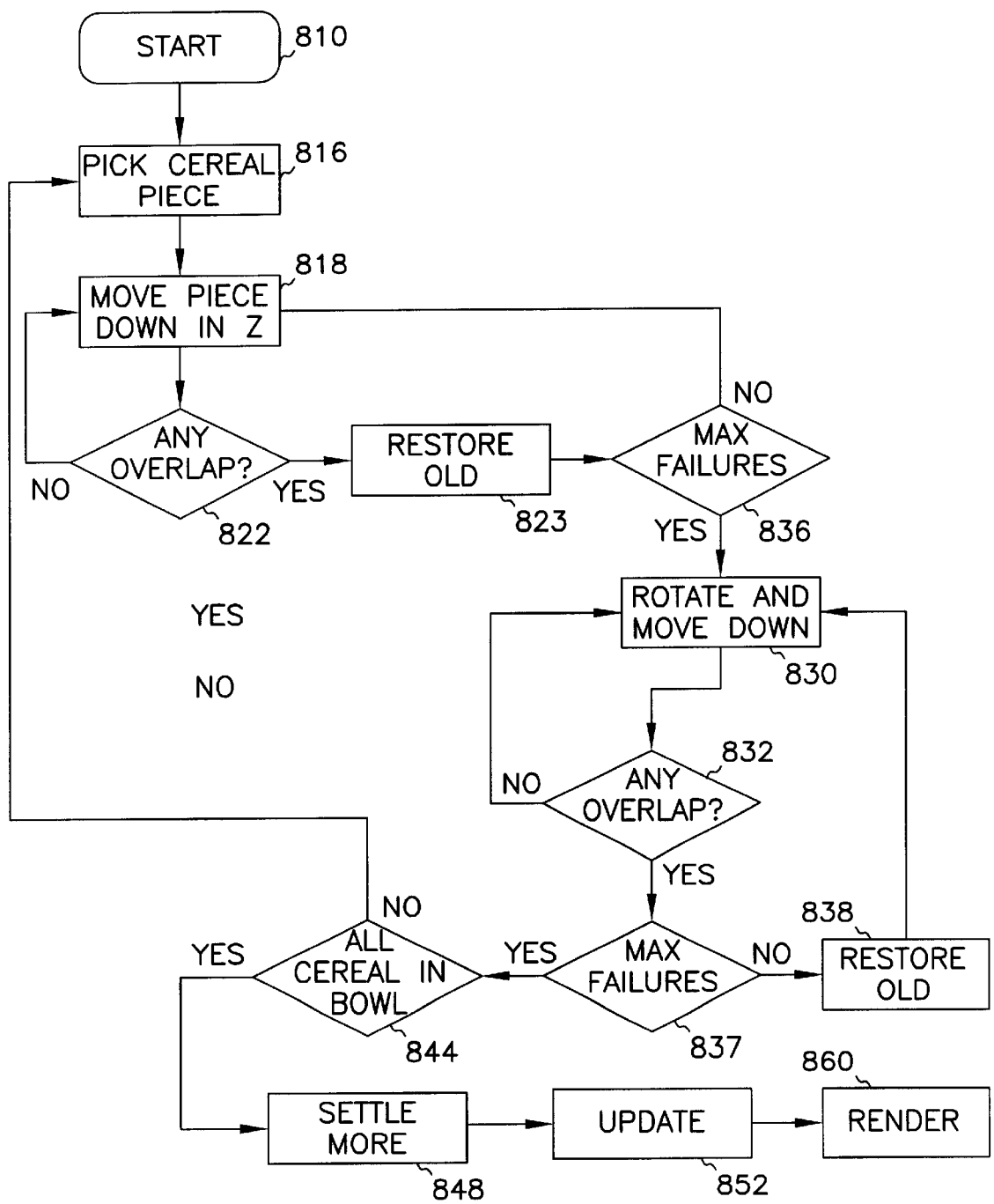
FIG. 8 is a block flow diagram showing steps involved in rendering an image of three-dimensional pieces in a container.

The steps to do this are shown in flowchart form starting at 810 in FIG. 8. Each of the blocks in the flowchart are representative of programming code, which may be in the form of objects or modules which may or may not correspond directly to the blocks as will be readily apparent to one skilled in the art. A cereal piece is picked at 816 and given a starting position above the bowl. The starting position is set at eight units above a bowl having a height of 3.5 units. The piece is moved a random amount between zero to 0.2 units in the negative z direction at 818 and then checked for overlap with other pieces and the bowl at 822. Possible overlap between the bowl and the cereal piece are calculated by looking at the distance of each control vertex on the piece with a function that is fit to the bowl. The starting position, bowl height and number of units to move, as well as the manner in which the amount of movement is selected may be varied by one skilled in the art.

Overlap is checked between cereal pieces at 822 by considering the distance between radius values associated with each control vertex. If no overlap has occurred then the piece is moved further in the negative z direction by returning to block 818. If overlap is detected at 822, the piece is restored to the previous position where no overlap occurred at 823, and a consecutive overlap failure count is incremented and failure limits are checked at 836. If the maximum consecutive number of overlap failures has not been reached, the piece is again moved down at 818. In one embodiment, the maximum consecutive number of overlap failures after attempting to move the piece down is ten. Each time the piece is successfully moved down without overlap, the maximum consecutive number of overlap failures is reset to zero. Other values for the number of overlap failures may also be selected, as well as other methods of ending the movement, such as an absolute limit on the number of attempts regardless of the overlap failures.

Once maximum failures have occurred at 836, the piece is subjected to small rotations and further comparable downward movement in order to help settle the piece in the bowl at 830. The rotations are in the x and y direction and are randomized between zero and five degrees. Overlap is again checked at 832. If no overlap is detected, the piece is further rotated and moved at 830. If overlap is detected, maximum consecutive rotation failures are checked at 837 in the same manner as done at 836. In some embodiments, the same code is used. If the maximum consecutive number of failures are not detected, the piece is restored to its previous position at 838 and the piece is further rotated and moved down at 830. Once the maximum consecutive rotation failures has hit the given limit, a check is performed at 844 to determine if all the cereal has been dropped into the bowl. If not, the next piece is picked at 816.

When all of cereal has been placed in the bowl, pieces are selected and further settled at 848 using the same process as shown at 830, 832, 837 and 838. Multiple random pieces are selected for this further settling. The number may depend on the size of the pieces, and in one embodiment is approximately 200. When all pieces have been further settled, the control vertex positions of each piece are saved, the graphics software is updated at 852 with all of the coordinate values and surface information, and the scene is rendered at 860. The cereal pieces with their texture as well as the bowl and a scene containing photo scanned images of a table with orange juice glass and milk pitcher are rendered together. After this render, additional modifications are made to the final scene. The final image is compared against an image that contains the background image and a mask image which contains non-black (i.e. pixel value is not 0 0 0 RGB) pixels. The non-black pixels in the mask image denote the front of the bowl which needs to be redrawn. The final step for this tool is to paste this image on the screen and to automatically crop it to its final size.

Figure 9:
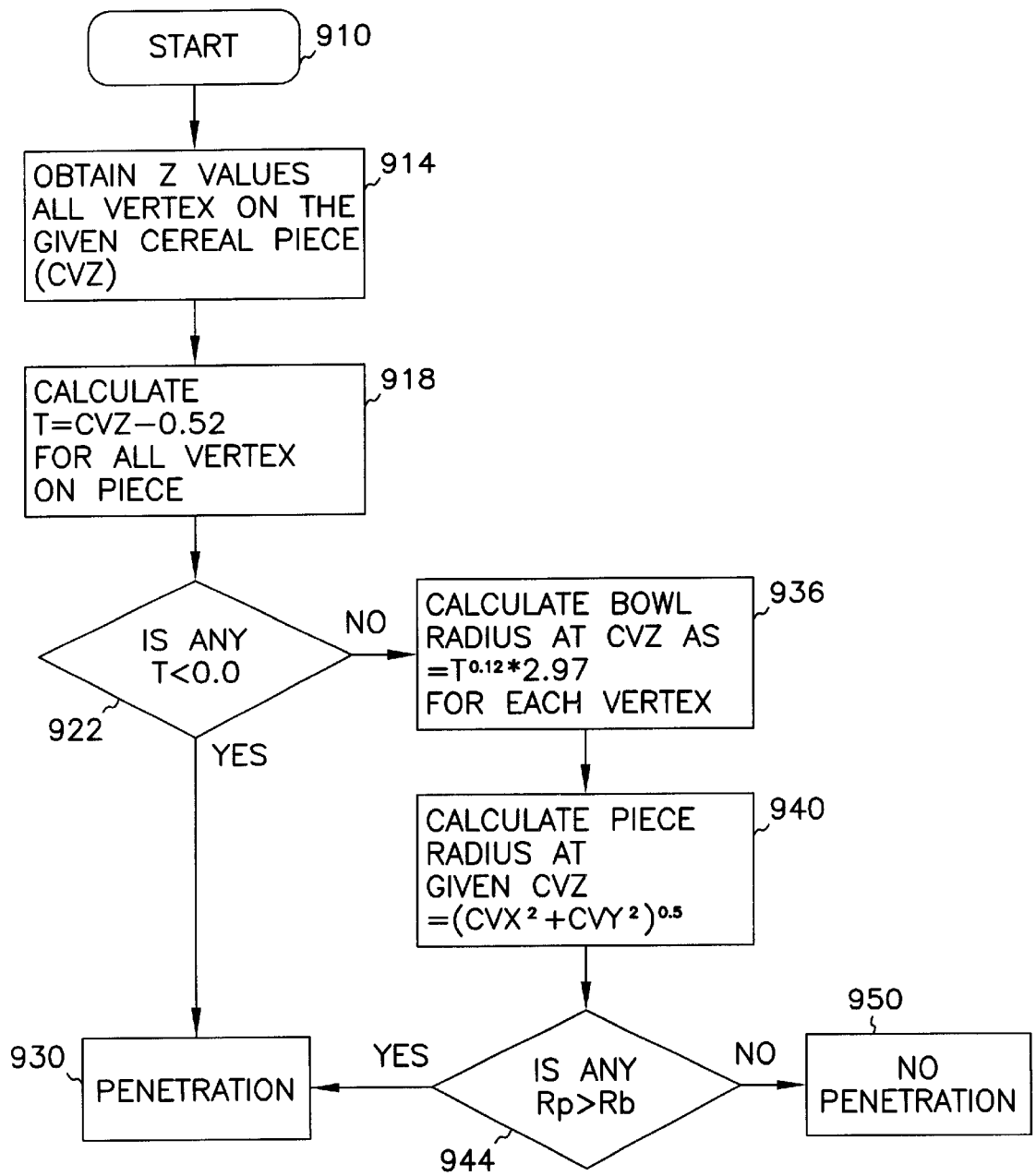
FIG. 9 is a block flow diagram showing steps involved in determining penetration of pieces in the container.

To check if the cereal piece is penetrating into the cereal bowl the following steps are done as represented in flowchart form in FIG. 9 starting at 910. For each cv on the cereal piece, get its z coordinate (cvz) at 914. A variable t is calculated as t=(cvz−.52) at 918, and then if (t<0.0) at 922, the piece is below the bottom of the bowl. In other words, penetration of the bowl as occurred at 930. If not, then the bowl radius and piece radius are calculated at 936 and 940 respectively. The bowl radius=$t^{(0.12)}*2.97$, and the piece[13] radius=$(cvx*cvx+cvy*cvy)^{0.5}$ If the piece_radius is greater than bowl_radius as indicated at 944, then penetration has occurred at 930. If not, no penetration has occurred as indicated at 950.

Figure 10:
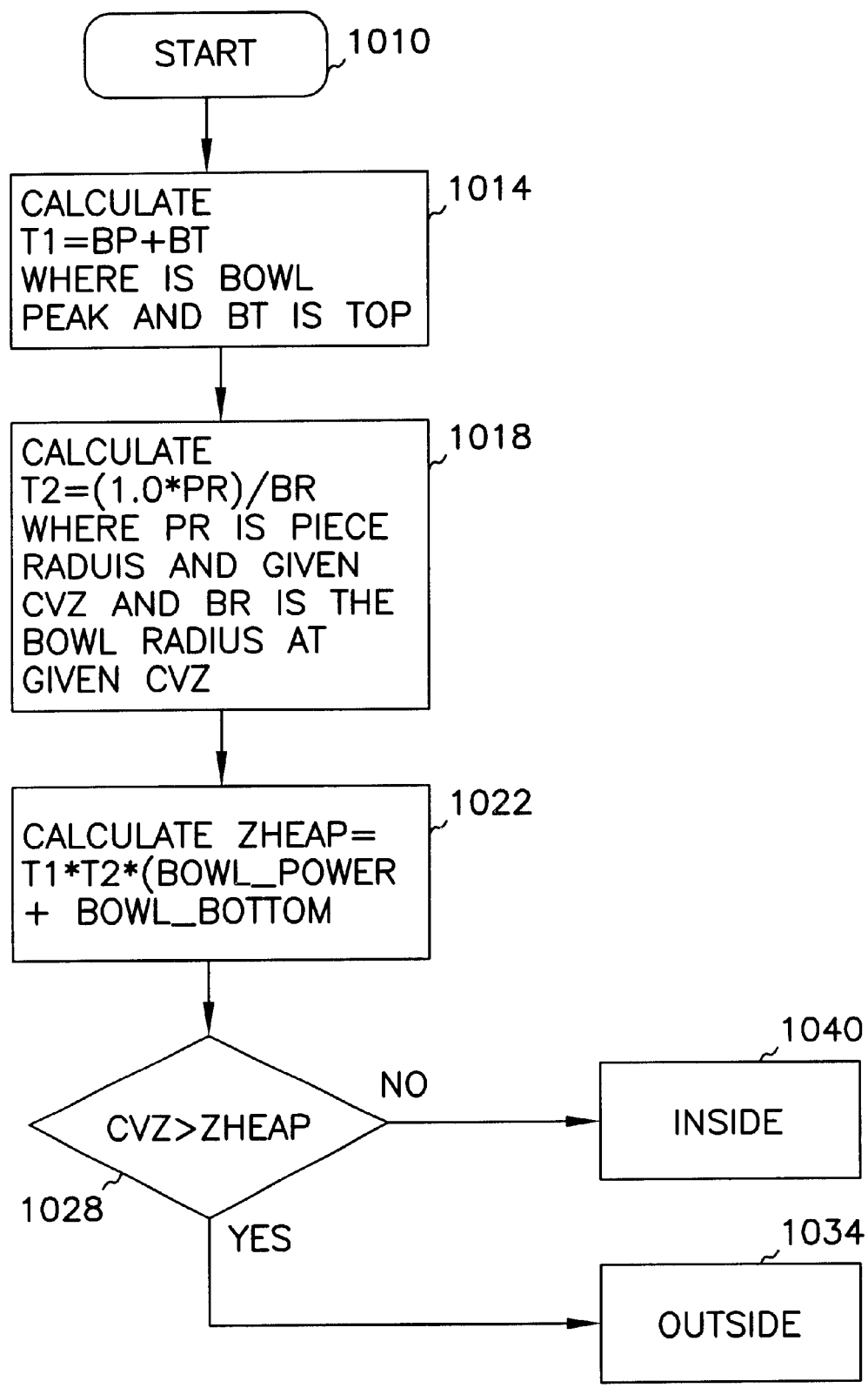
FIG. 10 is a block flow diagram showing steps involved in determining whether pieces are within an acceptable boundary of the container.

If both of these tests have been passed then a final check is needed which determines if the cereal piece is contained inside an area that represents the area that would be occupied by a bowl filled with cereal with the steps indicated in a flowchart in FIG. 10 starting at 1010. At 1014, a value t1 is defined as, t1=bowl_peak$_{bowl13}$ top. At 1018, a value t2 is defined as t2=(1.0−piece_radius)/bowl_radius. A value zheap, is defined as zheap=t1*t2*(bowl$_{13}$ power_p+bowl_ bottom) at 1022.

where bowl_peak=4.0
bowl_radius=2.97
bowl_power_p=2.0
bowl_bottom=0.52

At 1028, if cvz>zheap then the piece is outside of this area as indicated at 1034. If not, then the piece is inside the area at 1040.

One further tool is a coating tool, which is used to create or modify a variety of coatings that are applied on top of cereal pieces to create frost, glaze, and particulates. The density, size of particles, type of coating, and color can be chosen. The coating tool can create a new coating or modify an existing coating. Once the user has selected the desired parameters, the tool creates a generic modeling program shader and modifies all needed parameters to create a shader which when layered on a cereal piece will create the look of a plain cereal piece that has been coated.

Figure 11A:
FIG. 11A is a user interface panel for a coating tool for selection of parameters pertaining thereto.

A user interface or panel for the coating tools is shown at 1110 in FIG. 11A. This tool has a wide range of parameter choices. Some parameters are only available when particular parameters above them have been selected. In order to show as many parameters as possible, several scenarios are shown in FIG. 11. When a show samples checkbox 1112 is selected, all other parameters will be unselected. When this tool is run with this parameter checked, a panel will appear showing a wide range of coating examples as applied on a select cereal piece. The parameters used for the particular coating example will be displayed as well. This will help in determining the correct parameters to use for the type of coating desired. At checkbox 1116, a user can choose to either modify shader parameters for a shader that has already been created, or to make a new shader with parameters as selected. At 1118, there are several classes of coatings to choose from. Each particular class of coatings has a set of associated parameters which give the user more control. The first type of coating that can be selected is "particulate built in". This is used for coatings with uniform size or near uniform sized particulates such as a cinnamon coating. The next type of coating than can be selected is "particulate custom". While this type is used in similar areas as "particulate built in", it has more parameters to choose which allow for more control. However, it uses an algorithm for the texture, which is less general than that used in "particulate built in". The third type of coating that can be created is a frosted coating. This differs from particulate coatings in that the coating tends to be more blended together or smeared as opposed to separated granules. The fourth type of coating that can be created is a glaze coating. This type is used for shinny coatings and can range from a very transparent coating such as honey to an opaque coating similar in appearance to enamel paint.

At 1122, a density parameter controls the amount of particulates that a coating will have. A higher number means that the coating will be more dense. At 1124, a size parameter controls the size of the particulates. If the size of the particulates becomes too large relative to the viewing distance and size of the cereal piece, the coating may look unrealistic.

No matter what type of coating is selected, it will have a particulate color associated with it as indicated at 1130. A range of predefined colors is available. The user can choose to create a unique color by selecting custom at 1130. If selected, a color palette is provided from which the user may select colors to combine and save for use.

Figure 11B:
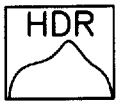
FIG. 11B is a further user interface panel for a coating tool for selection of parameters pertaining thereto.

In FIG. 11B, a variation of the coating tool panel is shown at 1140 when the "particulate custom" checkbox is selected. A density parameter 1144 determines the density of the coating applied. A higher number is a higher density of coating. A compact parameter 1148 determines how close together granules that make up each cluster are. The higher the number, the closer the granules are to one another. A clustering parameter 1152 determines how much grouping occurs.

There are three different sizes of particles created as indicated by size parameters 1156. The size of each can be set individually. In general, an arbitrary value of 4 or less achieves best results. Further, each different size of particle can also have a percent associated with it at 1160 to determine the relative numbers of the different particles in the coating. At 1164, a directory location and name 1168 can be specified for a file created with these parameters so that it can be found and used again. 3D Computer Generated vs. Photography Listed below are some of the differences between a shot generated using the present invention vs. an image that is a photograph of real product. It should be noted that in each case below, the differences may be very difficult to detect due to the fact that the computer rendered image is very photorealistic. To eliminate all the differences would take much greater processing time and provide little value, as the rendered images provide a very photorealistic image.

The computer-generated image may lack detail and randomization in regard to color, texture, and shape. Color variation within the piece will be less random than real cereal pieces. One may be able to detect color patterns within the computer rendered cereal pieces. Textures may look uniform compared to real cereal pieces i.e. air bubbles and defects may not be as randomized. Although our invention eliminates penetration of cereal pieces, many prior art computer generated images will have penetration between objects.

Lighting and shadowing variations may be detected as in the two following examples: The spoon, bowl or other objects in a scene that have been scanned in from a true photo may have different lighting than the cereal pieces that were rendered on the computer. If milk is not computer rendered in the scene, the cereal pieces will not cast natural reflections onto the milk.

If not settled enough through the cereal placement algorithms, the computer rendered cereal pieces may appear to be floating or in an unnatural position compared to real cereal pieces that have actually been settled due to gravitational forces.3D Computer Generated vs. 2D Computer Paint Packages 3D Computer Graphics programs have tools and allow the user to create objects or cereal pieces from scratch, whereas, 2D paint packages assume there is a starting image. Thus, it is much more difficult on a 2D paint package and there is much lower likelihood of success in creating realistic cereal piece(s) from scratch. 3D computer graphics will incorporate realistic lighting from different 3D perspectives as well as shading into the scene. 2D paint packages cannot do this unless the shadows and lighting highlights are specifically drawn in by the user which usually leads to a somewhat unrealistic effect.

3D Computer Generated vs. Pencil Marker, or Painted Art

Photorealistic textures can be incorporated into cereal pieces generated by 3D computer graphics. Pencil, marker, or painted images typically depict fairly uniform texture and color variations with obvious brush, marker or pencil strokes. Computer rendered images can easily incorporate actual photographic settings to merge with the nearly photorealistic computer generated cereal pieces. This leads to an overall perception of full reality to the observer. Painted or drawn images, on the other hand, cannot incorporate photographed settings due to the discontinuity between the photorealism of the drawing vs. the photorealism of the actual photograph.

Most drawings or paintings of cereal will not incorporate shadowing from piece to piece, piece to milk, or piece to container due to the time consuming nature of analyzing and actually drawing or painting in each shadow.

The computer can also easily incorporate a complex lighting scheme of several spotlights along with ambient lighting, whereas this type of lighting would be very complex to depict in a drawing or painting.

It is typical in drawings or paintings to show all pieces in a forward facing position due to the difficulty in drawing realistic looking side or backward angled pieces. When pieces drawn at different orientations are mixed in the same setting, individual pieces often appear to be odd shapes and/or penetrating each other versus just being in a different orientation. 3D computer graphics allows pieces to be shown at any angle and appropriate shading and shape make them appear realistic.

An iterative process is used to modify the computer rendered image based on successive rounds or cycles of obtaining consumer feedback. Thus, a first image is produced and shown to consumers. Feedback from the consumers is provided to the designer of the cereal. Using the tools in the present invention, the cereal is modified further in accordance with the feedback. The resulting second image is again shown to consumers and perhaps again modified based on feedback. Many cycles can be performed in the same manner. Performing these cycles in an iterative manner without actually producing cereal saves significant time, effort and expense. The resulting shot can even be used by engineers as a blueprint to modify cereal producing machinery and processes to produce a real cereal product that appears like the cereal in the shot.

It is to be understood that the above description is intended to be illustrative, and not restrictive. For instance, while the invention has been described with respect to pieces of cereal being designed and placed in a bowl, many other types of pieces, such as grain based snack foods, candy, and machine parts may also be designed and placed in containers such as packages. Further, the container may comprise a bag, or even the floor to model pieces that have fallen. Other modeling tools may also be used, and interfaces other than panels provided. Further interfaces may comprise a command prompt, from which commands with parameters may be directly entered. Many other embodiments will be apparent to those of skill in the art upon reviewing the above description. The scope of the invention should, therefore, be determined with reference to the appended claims, along with the full scope of equivalents to which such claims are entitled.

What is claimed is:

1. An image rendering system comprising:

a three-dimensional representation of a piece;

a container tool that combines representations of multiple pieces in a representation of a container, wherein the container tool moves pieces into the container based on a simulation of the effect gravity would have on the pieces; and a rendering tool that produces an image of the multiple pieces in the container.

2. The image rendering system of claim 1 wherein the at least a portion of the multiple pieces are not identical.

3. The image rendering system of claim 2 wherein the at least a portion of the multiple pieces are randomized versions of the three-dimensional representation of the piece.

4. The image rendering system of claim 1 wherein the container tool rotates the piece to settle it in the container in relation to the container and other pieces already in the container.

5. The image rendering system of claim 4 wherein container tool further settles selected pieces following all of the pieces being moved into the container.

6. The image rendering system of claim 4 wherein each image is represented by control vertices which are used to limit movement of the pieces into the container.

7. The image rendering system of claim 1 wherein multiple different types of pieces may be selected for movement into the container.

8. The image rendering system of claim 1 wherein multiple different types of containers may be selected.

9. The image rendering system of claim 1 wherein the pieces are pieces of food.

10. The image rendering system of claim 9 wherein the pieces are cereal pieces, and the container is a bowl or spoon.

11. An image rendering system comprising:

a computer system having a processor that executes computer programs and a memory that stores the computer programs;

a three-dimensional representation of a physical piece stored in the memory;

a container tool stored in the memory that moves multiple pieces into a container based on a simulation of gravitational effects; and a rendering tool that produces an image of the multiple pieces in the container.

12. The image rendering system of claim 11 and further comprising a display device for displaying the image.

13. The image rendering system of claim 11 and further comprising a photo quality printer for printing the image.

\* \* \* \* \*